Figure 6A:
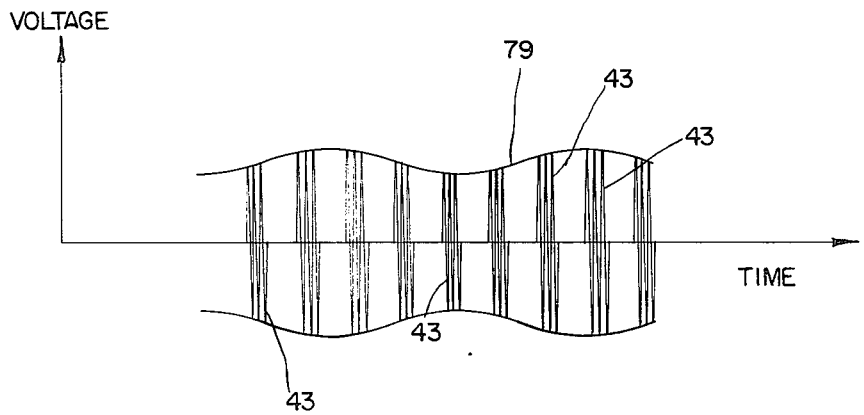

June 14, 1966 R. B. HAWES 3,255,984
BEAM RIDING GUIDANCE SYSTEM
Filed June 13, 1963 3 Sheets-Sheet 1
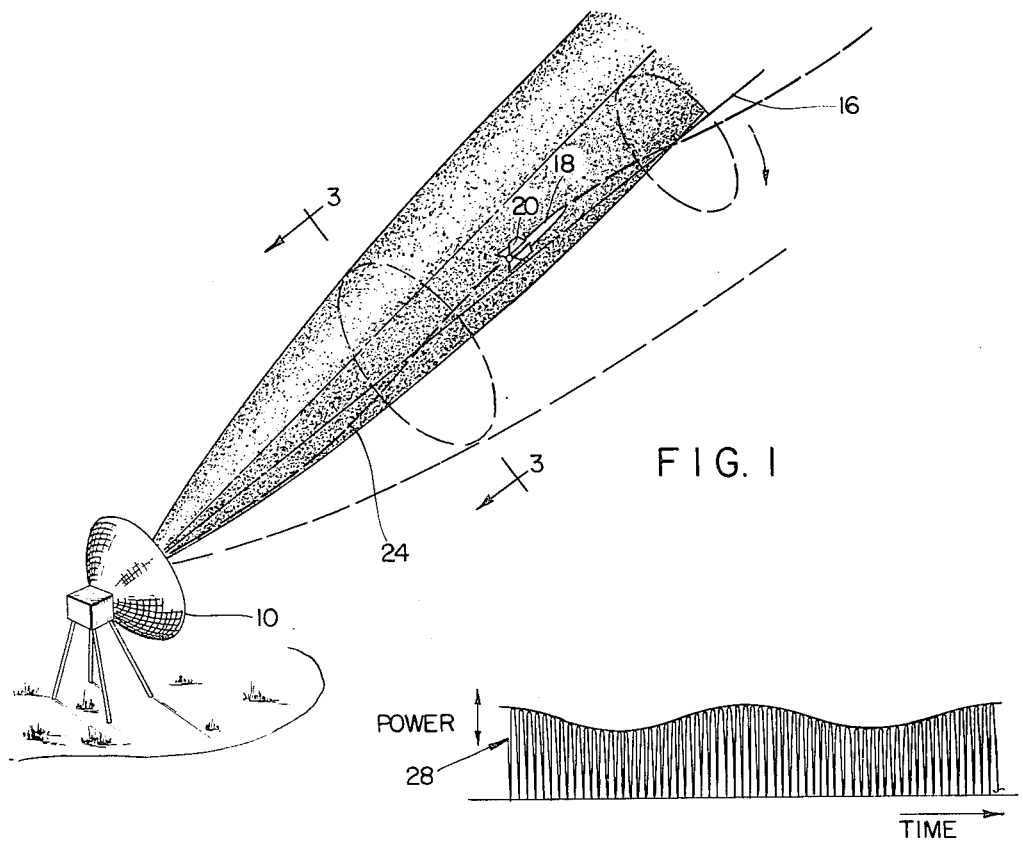
FIG. 1
FIG. 2
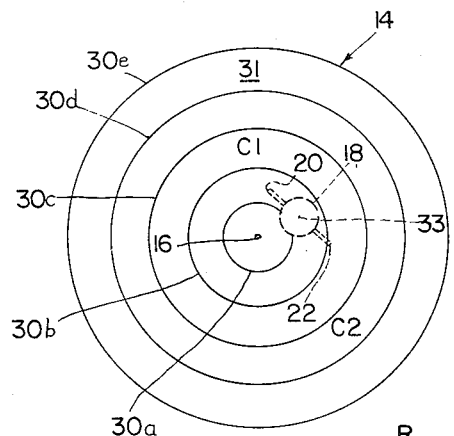
FIG. 3
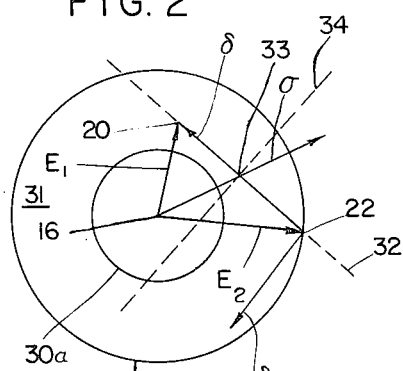
FIG. 4
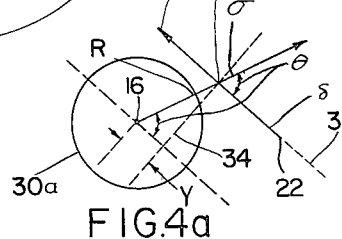
FIG. 4a
INVENTOR.
RUSSELL B. HAWES
BY
ATTORNEY

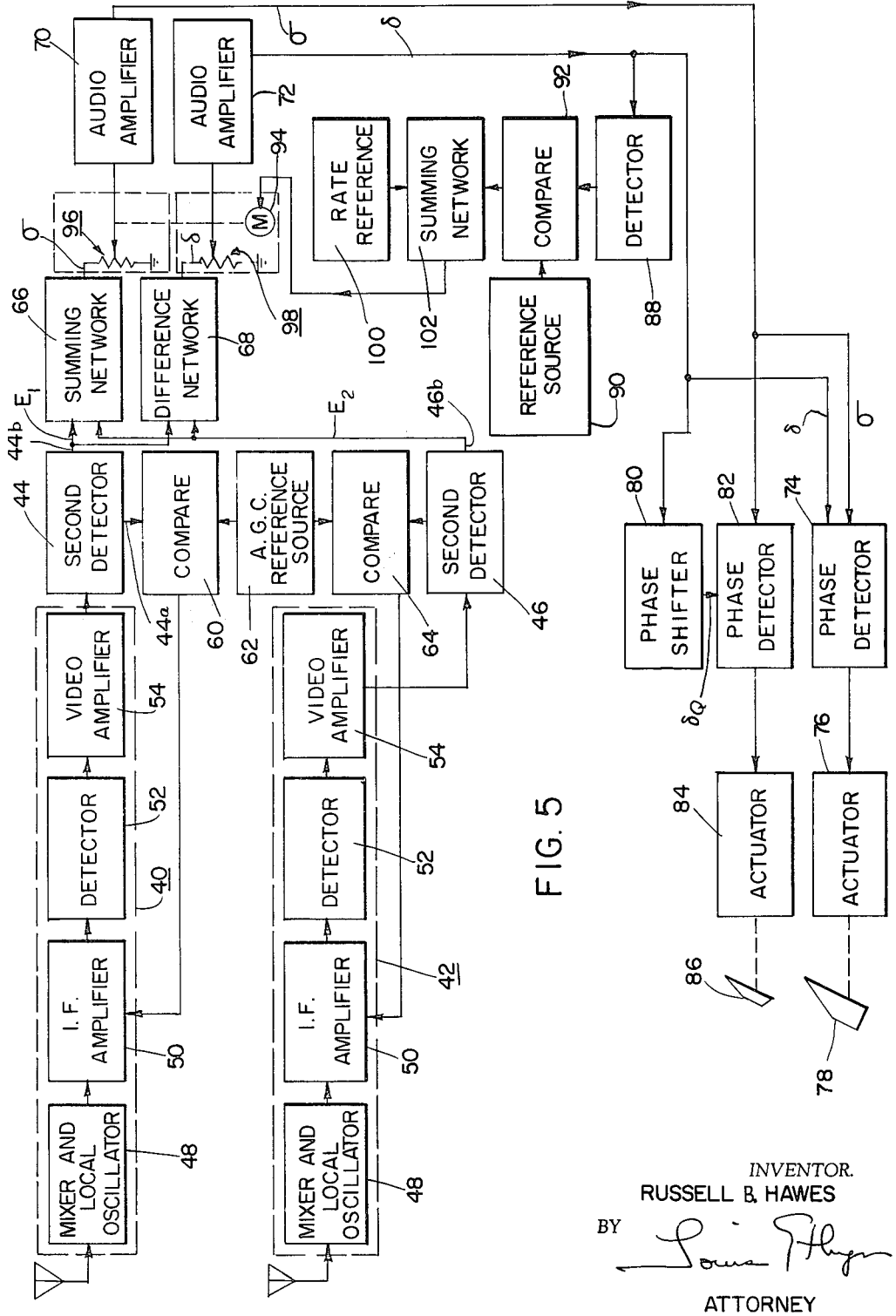

*INVENTOR.*
RUSSELL B. HAWES
BY
ATTORNEY

3,255,984
BEAM RIDING GUIDANCE SYSTEM
Russell B. Hawes, Nashua, N.H., assignor to Sanders Associates, Inc., Nashua, N.H., a corporation of Delaware
Filed June 13, 1963, Ser. No. 287,713
12 Claims. (Cl. 244—14)

This invention relates to a method and apparatus for guiding a beam-riding vehicle along the central axis of a conical radiation pattern.

In accordance with the invention, electromagnetic radiation conically swept about the central axis illuminates two antennas on the vehicle that are spaced apart transverse to the axis. The antennas develop amplitude-modulated signals that are combined and processed as detailed below to develop guidance signals which steer the vehicle to maintain its path on the axis.

In a beam-riding guidance system, a guiding station, beams electromagnetic energy in the direction the vehicle is to travel. The vehicle then guides itself along the central axis of the beam by sensing displacement from the axis.

Prior beam-riding guidance systems require the guiding station to transmit coordinate reference information, to enable the vehicle to determine its deviation from the desired path. With this information, the vehicle determines the direction it must travel to return to the desired path. In addition, because the vehicle is subject to roll, either the roll must be controlled or the amount thereof must be accurately determined. Otherwise, the direction the vehicle will take when corrective signals are applied to its steering devices cannot be predicted.

The need for these two types of reference information, (1) the direction from the vehicle to the beam axis, and (2) the vehicle's roll attitude with respect to the beam axis, necessitates, in the first place, the use of specially coded information in the radiation energy beamed at the vehicle. By way of example, the coding may take the form of a selected pulse repetition rate, scan rate or polarization. In addition, gyro stabilization or roll reference equipment is required in the vehicle, and also in the guiding station if the latter is moving. These requirements add to the cost of the guidance system, and, moreover, the special transmission code of the guiding station equipment often renders the guiding station transmitters unsuitable for other purposes, such as advanced radar tracking.

Accordingly, it is an object of the present invention to provide an improved method for guiding a beam-riding vehicle. Another object of the invention is to provide a relatively simple method of guiding a beam-riding vehicle.

A further object of the invention is to provide a method for guiding a vehicle along the axis of a radiation pattern without requiring the coordinate reference information to be transmitted in the pattern.

Yet another object is to provide a vehicle guidance method that can be practiced with a fairly wide range of readily available transmitting equipment.

Still another object of the invention is to provide apparatus for practicing the foregoing method.

A further object of the invention is to provide a vehicle guidance system that operates with relatively simple guidance equipment.

Another object of the invention is to provide a guidance system of the above character in which the radiation from the guiding station may be suited for uses other than vehicle guidance.

Another object of the invention is to provide a guidance system of the above character that does not require roll reference apparatus in the vehicle or the guiding station.

Other objects of the invention will in part be obvious and will in part appear hereinafter.

The invention accordingly comprises the several steps and the relation of one or more of such steps with respect to each of the others, and the apparatus embodying the features of construction, combination of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawings, in which:

FIG. 1 is a simplified pictorial representation of a vehicle beam-riding guidance system using a conically swept radiation pattern, FIG. 2 shows the waveform of the power at a typical point in a conically swept radiation pattern, FIG. 3 is a schematic cross sectional representation of the conically swept radiation pattern, taken along line 3—3 of FIG. 1, FIG. 4 is a vector representation of the signals developed with a guiding system embodying the invention, FIG. 4a is a diagram showing the relationship between the yaw error and the position of the guided vehicle with respect to the central axis of the guiding beam, FIG. 5 is a schematic representation, in block form, of guidance control equipment for practicing the present invention, and FIG. 6 illustrates three signals developed present in the equipment of FIG. 5.

In the description of the invention, the term "beam" refers to the electromagnetic energy radiated by the guiding station at any instant. The term "pattern," on the other hand, refers to the volume defined by a sweep of the beam about the central axis. Hence, with the present invention, the vehicle is guided along the central axis of a radiation pattern rather than along the axis of a radiation beam, as these terms are defined above. However, keeping these distinctions in mind, the present system will nevertheless be referred to as a "beam-riding" guidance system, according to the present terminology of the art.

In accordance with the present invention, a beam-riding vehicle utilizes the periodic variation in the strength of the signal it receives from a conically swept pattern to develop guidance signals that steer the vehicle along the pattern axis. No coordinate reference information is required from the pattern, and the vehicle and guiding radar do not need roll stabilization or roll reference information.

As shown in FIG. 1, an antenna 10 located at a guiding station radiates energy in a beam 12 that is conically swept about an axis 16 to form a conical radiation pattern 14. The sweep rate of the beam 12 is generally many times less than the frequency of the energy in the beam, referred to as the carrier frequency. A vehicle 18 travelling in the pattern 14 guides itself along the axis 16 in response to signals it develops from the pattern 14.

The vehicle 18 carries two antennas 20 and 22, spaced apart from each other transverse to the axis 16. The vehicle's roll axis is parallel to its direction of travel. In the present embodiment, its pitch axis, perpendicular to the roll axis, will be defined as the line between the antennas 20 and 22. The vehicle's yaw axis, also perpendicular to the roll axis, is perpendicular to the line between the antennas 20 and 22.

The antennas 20 and 22 sense the conically swept radiation from the antenna 10 and provide signals that are combined and demodulated in the manner described hereinafter to provide guidance signals that steer the vehicle 18 so that its path 24 follows the cone axis 16.

The power from the radiation pattern 14 of FIG. 1 incident upon an antenna 20 or 22 remains substantially constant, unaffected by the sweeping movement of the beam 12 when the antenna is positioned on the cone axis 16. However, when the antenna is displaced from the cone axis 16, the power incident upon it fluctuates, or is modulated, at the sweep rate as the beam 12 periodically moves toward and away from the antenna during its rotation about the axis 16. The power modulation factor, or amplitude of the power fluctuation, increases with the distance of the antenna from the cone axis 16.

The amplitude-modulated power incident upon the antenna has the form illustrated in FIG. 2. The instantaneous power is represented by a wave 28 that varies rapidly at the twice carrier frequency. The modulation factor, $m$, denotes the percent variation in the amplitude of the wave 28 with respect to its average value.

When the wave 28 is substantially sinusoidally modulated at the sweep frequency $f_m$, as is the case for small deviations of the antennas 20 and 22 from the axis 16, the instantaneous value A of the modulation envelope 29 outlining the wave 28 is given by:

$$A = P[1 + m \cos (2f_m t + \phi)] \quad (1)$$

where

P is the average power,
$t$ represents time, and
$\phi$ is the phase angle relative to an arbitrary reference.

With the system of FIG. 1, the power incident upon each of the antennas 20 and 22 on the vehicle 18 is governed by Equation 1. However, since the antennas are spaced apart in a direction transverse to the cone axis 16, they are generally at different distances from the axis and at different angular positions with respect to it. Therefore, in general, both the amplitude of the power fluctuation (i.e., the factor $m$) and its phase (i.e., angle $\phi$) are different for the two antennas.

FIG. 3 is a pictorial cross sectional representation of the conically swept radiation pattern 14. The antennas 20 and 22 are spaced apart by a distance $d$ on the vehicle 18, which is outlined with a dashed line. The power delivered to any point P on the plane 31 of the cross section of FIG. 2 is primarily a function of the average power radiated by the antenna 10 (FIG. 1), the range between the antenna 10 and the plane 31, and the distance between the point P and the cone axis 16. Thus, within the plane 31, the power varies only according to the distance from the axis 16.

More specifically, with further reference to FIG. 3, as the beam 12 (FIG. 1) rotates about the central axis 16, the modulation factor ($m$) of the power from the transmitter has a constant value along each of the circles 30a, 30b, 30c, 30d and 30e, etc., centered on this axis. However, it is different from one circle to the next, increasing with the radius of the circle. To a first approximation, for radii small compared to a beamwidth the value of the modulation factor at each circle is in direct proportion to the radius thereof.

A further characteristic of the modulation of the power delivered to point P on the plane 31 is that the radius of a circle representing a given modulation factor $m$ is proportional to the range of the plane 31 from the antenna 10 (FIG. 1). Accordingly, the radii of the circles 30a–30e increase as the vehicle 18 moves away from the antenna 10.

The foregoing discussion regarding the modulation factor of the power developed at each point in the plane 29 will now be related to the voltage developed by each of the antennas 20 and 22. The voltage is proportional to the square root of power incident on the antenna and thus proportional to the square root of the right hand side of Equation 1. Assuming that the modulation factor $m$ is no greater than 0.3 or so, as is the case at points fairly close to the axis 16, the square root of $$[1 + m \cos (f_m t + \phi)]$$

can be closely approximated by the first two terms of its binomial expansion:

$$1 + \frac{m \cos (f_m t + \phi)}{2}$$

Thus, the voltage V is given by $$V = k\sqrt{P}\left[1 + \frac{m \cos (f_m t + \phi)}{2}\right] \quad (2)$$

where $k$ is a constant.

It is seen that, with this approximation, the above statements made with reference to FIG. 3 and the power modulation envelope 29 also apply to the voltage modulation envelope. Accordingly, the voltage developed by an antenna located along one of the circles 30a–30e has a constant modulation factor that is substantially proportional to the radius of the circle. It will be noted that the alternating component of the voltage envelope is given by $$V_{ac} = k\sqrt{P}\frac{m}{2} \cos (f_m t + \phi) \quad (3)$$

That is, rectification of the radio frequency signal intercepted by an antenna will provide a voltage of this nature.

FIG. 4 is an enlarged view of the plane 31 of FIG. 3 showing only the circles 30a and 30b. $E_1$ is a vector drawn from the cone axis 16 to the position of the antenna 20. Since the modulation factor $m$ is proportional to the distance from the axis 16, the length of the vector $E_1$ is proportional to the amplitude of the modulation factor of the voltage developed by the antenna 20 in response to illumination with the conically swept radiation pattern 14 of FIG. 1. Similarly, the magnitude of the vector $V_2$, extending from the axis 16 to the position of the antenna 22, is proportional to the modulation factor of the voltage developed by the antenna 22.

Furthermore, the relative angles of the vectors $E_1$ and $E_2$ around the axis 14 are equal to the relative phases of the modulation envelopes at the respective antennas.

This is readily comprehended from the fact that the alternating component of the modulation envelope at each antenna is due to the rotation of the transmitted beam in a circle around the axis 16 (as shown in FIG. 1). The modulation voltage deevloped by each antenna alternates between a maximum when the beam passes by it and a minimum when the beam is 180° away with respect to the axis 14. Each cycle of this alternating voltage corresponds to a full 360° rotation around the axis 16, and thus when the beam rotates from one position to another, the angle covered in the plane 31 is the same as the electrical phase angle between voltages developed at the two points.

Thues, the angle between the vectors $E_1$ and $E_2$ is the phase angle between the modulation envelopes at the antennas 20 and 22, and the vectors therefore are representative of the alternating components of these envelopes. Similarly, in the system described below, they represent the detected alternating voltages at these points.

With further reference to FIG. 4, the vector designated with the symbol $\sigma$ is the vector sum of $E_1$ and $E_2$. A study of the geometry involved indicates that this vector extends through the midpoint 33 of the pitch axis 32 extending between the antennas 20 and 22. Further, the magnitude of the vector $\sigma$ is twice the magnitude of a vector from the axis 16 to the midpoint 33.

Another characteristic of the modulation envelope vectors $E_1$ and $E_2$ is that at any given range, the magnitude of their difference, indicated in FIG. 4 by the vector $\delta$, is directly proportional to the distance $d$ (FIG. 3), between the antennas 20 and 22. Thus, the magnitude of the difference vector $\delta$ is independent of the location of the antennas 20 and 22 in the plane 31, provided the physical separation $d$ remains constant.

Next assume, by way of example, that control of the vehicle about the pitch axis 32 is affected by means of a stabilizer or elevator. Furthermore, a line 34 perpendicular to the axis 32, corresponds to the yaw axis of the vehicle, and right-left control about this axis is accomplished by means of a rudder.

From FIG. 4 it is apparent that, if the central axis 16 is neither to the right nor left of the yaw axis 34, i.e., the yaw axis 34 passes through the axis 16, the $\sigma$ vector will be perpendicular to the axis 32 and thus perpendicular to the $\delta$ vector. In the illustrated position, the central axis 16 is on the left of the yaw axis 34 (along the axis 32) and, as shown, the $\sigma$ vector has a component along the axis 32 and directed opposite to the $\delta$ vector. If the central axis 16 were to the right of the axis 34, the $\sigma$ vector would have a component in the same direction as the $\delta$ vector.

In terms of the electrical quantities represented by the vectors of FIG. 4, and in particular, $\sigma$ and $\delta$ voltages corresponding to the $\sigma$ and $\delta$ vectors and equal to the sum and difference, respectively, of the voltages represented by the vectors $E_1$ and $E_2$, this means that, if the $\sigma$ voltage has a component in phase with the $\delta$ voltage, the axis 16 is to the (vehicle's) right of the axis 34. If the $\sigma$ voltage has a component opposite in phase to the $\delta$ voltage, the axis 16 is to the left of the axis 34. If the axis 34 passes through the axis 16, i.e., the axis 16 is in the correct left-right position with respect to the vehicle, the $\sigma$ voltage is 90° out of phase with the $\delta$ voltage. These three conditions can be ascertained by applying the $\sigma$ and $\delta$ voltages to a conventional phase detector.

With reference to FIG. 4a, it will be observed that the magnitude of the positional error along the pitch axis 32 is a function of two factors, to wit: (1) the distance R between the central axis 16 and the point 33, and (2) the angle $\theta$ between the axis 32 and a line joining the axis 16 and the point 33. In particular, this error Y is given by, $$Y = R \cos \theta \qquad (4)$$

However, the R is proportional to the $\sigma$ vector, and $\theta$ is the angle between the $\sigma$ and $\delta$ vectors. Thus, the yaw error, which is related to these quantities by, $$Y \alpha \sigma \cos \theta \qquad (5)$$

is fully represented, in direction and magnitude by the output of the phase detector to which the $\sigma$ and $\delta$ voltages applied.

More specifically, assume a conventional diode-type phase detector in which one of the input signals is relatively large, is of constant magnitude and has a fairly square waveform. The magnitude of the output of the detector is then proportional to the product of (1) the magnitude of the other input, and (2) the cosine of the phase angle between the two inputs. The $\delta$ voltage, as pointed out above, is constant over the plane 31. Thus, if it is amplified sufficiently and given a square waveform, the output of a phase detector to which the $\sigma$ and $\delta$ voltages are applied will have the form of Equation 5.

The direction of the pitch error (along the axis 34) may be ascertained by rotating the $\delta$ vector 90° and then determining whether the resulting vector $\delta_Q$ has a component along or opposite to the $\sigma$ vector. Thus, in the illustrated position, the $\delta_Q$ vector has a component opposite to the $\sigma$ vector. If the vehicle is displaced so that the axis 16 is on the opposite side of the pitch axis 32, the direction the $\sigma$ vector will be reversed and the $\delta_Q$ vector will have a component along the $\sigma$ vector. A study of other possible positions of the vehicle with respect to the axis 16 shows that this test always indicates the location of the axis 16 with reference to the vehicle's axis 32. The test is readily made by means of a second phase detector.

More specifically, the $\delta$ signal is first passed through a 90° phase shifter and then resulting $\delta_Q$ signal and the $\sigma$ signal are applied to the inputs of the second phase detector. The polarity of the output signal of the phase detector indicates the direction of the pitch error and by a derivation similar to that made for yaw error, it can be shown that the magnitude of the signal is proportional to the magnitude of the pitch error.

It will be noted that the 90° phase shift can be applied to the $\sigma$ signal instead of the $\delta$ signal Furthermore, the shift can be either an increase or a decrease in phase angle, all of which is readily comprehended by inspection of the vector diagram of FIG. 4.

Thus, the position of the central axis 16 with respect to two coordinate axes (32 and 34) of the vehicle is unambiguously determined by the system described herein. The two positional error or guidance signals developed by the system may be applied to steering mechanisms in the vehicle to automatically maintain the direction of travel substantially along the axis 16. In this connection, it should be pointed out that the antennas 20 and 22 need not be on the steering axes of the vehicle, since simple phase shifting networks can be used to make the signals developed by the antennas conform to the orientation of these axes.

While the relationships explained above are strictly true only for small deviations of the antennas 20 and 22 from the central axis 16, they are sufficiently approximated at greater distances to permit "capture" of the vehicle by the beam and also to facilitate recovery from reasonably large transient excursions of the vehicle from its desired course.

As shown in FIG. 5, the illustrated guidance control equipment carried in the vehicle 18 for practicing the present invention with a pulsed signal from the guiding antenna 10 (FIG. 1) comprises, in general, a pair of receivers 40 and 42, each connected to receive the signal from one of the antennas 20 and 22. A pair of "video" detectors 44 and 46 convert the output signals of the receivers 40 and 42 into "audio" signals having the conical sweep frequency $f_m$.

More specifically, the energy radiated by the guiding antenna 10 (FIG. 1) typically consists of a succession of pulses or bursts of high frequency energy. As described above, the antennas 20 and 22 intercept the pulsed energy, upon which is superimposed the amplitude modulation due to the motion of the beam 12 about the axis 16 (FIG. 1). The pulse repetition rate is ordinarily substantially greater than the sweep rate $f_m$. The signal from antenna 20 is illustrated in FIG. 6a, which shows a series of radio frequency pulses 43 amplitude-modulated with the envelope 29 of FIG. 2. The signal from the antenna 22 is similar to FIG. 6a, except that in general the modulation factor $m$ and the phase of the modulation will be different.

Figure 6B:
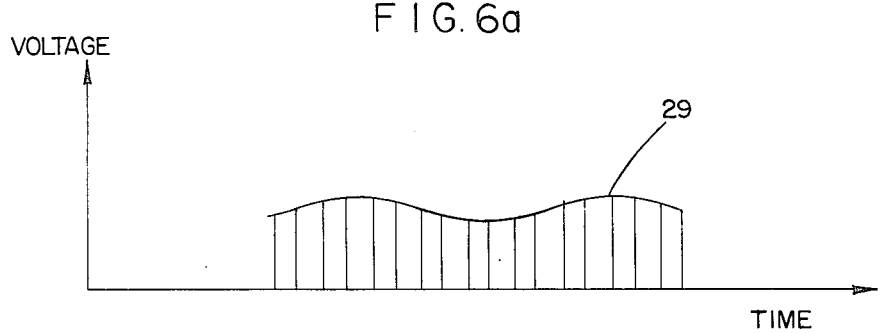

In the illustrative embodiment of the invention shown in FIG. 5, each of the video receivers 40 and 42 comprises a mixer and local oscillator 48 whose intermediate frequency output is amplified by an I-F amplifier 50. Next, the intermediate-frequency signal is applied to a detector 52 which removes the carrier frequency and delivers to a video amplifier 54 a succession of pulses which, as illustrated in FIG. 6b, conform to the envelope 29.

Figure 6C:
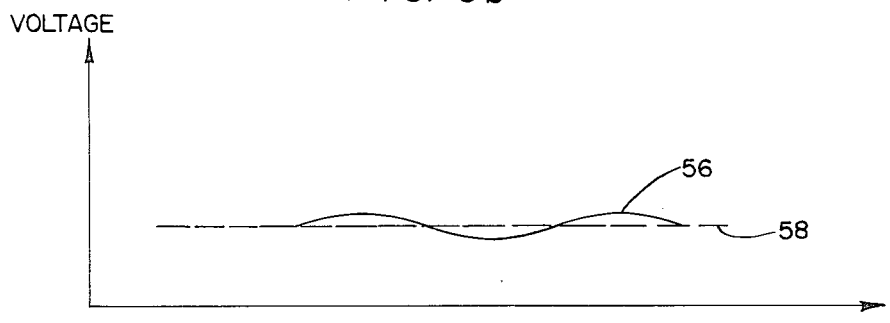

The second detectors 44 and 46, which may be simple averaging and filtering circuits, develop signals of the type shown in FIG. 6c. Each of these signals has an A.-C. component, shown at 56, super-imposed on a D.C. level 58. From Equation 3 it is seen that the magnitude of the A.-C. component is a function of both the modulation index, $m$, and the average, or carrier, power P. Moreover, the average power varies according to both the distance from the central axis 16 (FIGS. 1 and 4) and the distance along this axis from the transmitting antenna 10. The foregoing discussion assumed voltages whose changes are, in essence, due solely to variations in the modulation index. This is accomplished by means of an automatic gain control system which maintains the carrier level at a constant value at the inputs of the detectors 44 and 46.

More specifically, the D.-C. level 58 of FIG. 6 represents the level of the radio frequency carrier. The level 58, which appears at an output terminal 44a of the detector 44, is compared, in a comparison circuit 60, with the constant voltage of a reference source 62. If the level 58 differs from the reference level, an error signal is applied, for example, to the amplifier 50 to alter the gain therein until the level 58 closely approaches the reference level. This in turn modifies the carrier level at the output of the amplifier 50, so as to make it correspond to the reference level regardless of changes in the average power received by the antenna 20.

Similarly, the D.-C. level from the detector 46 is compared with the reference level in a comparison circuit 64, with the resulting error signal controlling the gain of the amplifier 50 in the receiver 42.

The A.-C. signals developed by the detectors 44 and 46, corresponding to the vectors $E_1$ and $E_2$ of FIG. 4, appear at terminals 44b and 46b. These signals are applied to a summing network 66 and a difference network 68, which develop output voltages corresponding to the $\sigma$ and $\delta$ vectors, respectively. In its simplest form, the network 66 may be a conventional resistor summing network; similarly, the network 68 may include a phase inverter for the $E_2$ signal, followed by a resistor summing network which adds the resulting ($-E_2$) signal to the $E_1$ signal.

After amplification by amplifiers 70 and 72, the $\sigma$ and $\delta$ signals are applied to a phase detector 74. In the manner described above, the detector 74 develops a D.-C. error or guidance signal which indicates yaw error, i.e., error along the vehicle axis 32 (FIG. 4). This signal is applied to an actuator 76, which operates a rudder 78 controlling movement of the vehicle around the axis 34 of FIG. 4.

With further reference to FIG. 5, the $\delta$ signal from the amplifier 72 is also passed through a 90° phase shifter 80 to develop the $\delta_\phi$ signal. This signal, along with the $\sigma$ signal, is applied to a phase detector 82. As described above, the output of the detector 82 is a D.-C. error signal which indicates pitch error, i.e., error along the vehicle's axis 34. This signal operates an actuator 84 controlling a stabilizer 86. The stabilizer, in turn, controls movement of the vehicle around the axis 32 of FIG. 4.

The amplifier 72 preferably has substantially more gain than the amplifier 70, so that the $\delta$ and $\delta_\phi$ signals applied to the phase detectors 74 and 80 have a materially greater amplitude than the $\sigma$ signal. This provides operation of the type described by Equation 5. If desired, waveform-squaring circuits may be inserted before the $\delta$ and $\delta_\phi$ inputs to the phase detectors, but generally the phase detectors themselves will perform the squaring function to a sufficient approximation.

In the above discussion, it was pointed out that, as the distance from the transmitter increases, the radii of the circles 30a–30e (FIG. 3) also increase. That is, the distance from the central axis 16 corresponding to a given index of modulation is roughly proportional to the distance from the transmitter. Thus, as guided vehicle moves outwardly along the beam, an error signal of a given magnitude will correspond to an increasing excursion of the vehicle from the axis 16. On the other hand, for optimum operation, the error signals operating the vehicle's control elements should bear a substantially unchanging relationship to errors in the position of the vehicle. As pointed out above, the difference voltage $\delta$ is constant over any plane perpendicular to the central axis 16. However, it is proportional to the radii of the circles 30a, etc., and thus, it decreases with distance from the transmitter. These two factors are utilized in compensating the guided system for changes in position along the direction of travel.

More specifically, as shown in FIG. 5, the difference signal $\delta$, as it appears at the output of the amplifier 72, is rectified by a detector 88, and the direct voltage output of the detector is compared with the voltage of a reference source 90 in a comparison circuit 92. Illustratively, the output of the comparison circuit, i.e., the difference between the magnitude of the rectified difference signal and the voltage of the source 90 is applied to a servo motor 94, which controls the gain in the sum and difference circuits by means of connections to potentiometers 96 and 98.

In this fashion, the motor 94 operates to maintain the difference voltage $\delta$ at the output of the amplifier 72 at a constant level corresponding to the voltage of the reference source 90. As the vehicle moves away from the transmitter, the gain must be increased to maintain the difference voltage at a constant level, and this increase amounts to a progressive contraction of the circles 30a, etc. (FIG. 3), so as to maintain the radii of the circles constant as the distance between the transmitter and the vehicle changes. Once the difference voltage $\delta$ is held constant, the proportionality between the lengths of the vectors of FIG. 4 and the distances from the central axis 16 also remains constant. Accordingly, the relationships between the error or guidance signals developed by the system and the magnitudes of the positional errors of the vehicle are unchanged as the vehicle moves toward or away from the transmitter.

There will be a lag in the range correction, and this lag may be substantial at high speeds. In such cases, the voltage applied to the servo motor 94 may be supplemented by the voltage from a rate reference source 100, added by means of a summing network 102. The voltage of the source 100 is roughly proportional to the speed of the vehicle, and its polarity depends on whether the vehicle is moving toward or away from the transmitter.

It should be noted that the range correction effected by means of the servo motor 94, and similarly the automatic gain control correction described above, are required only for accuracy in the magnitude of the yaw and pitch error voltage. If the only information required is the direction of the central axis 16 (FIG. 4) with respect to the reference coordinates of the vehicle, these controls are not necessary. All that is required is correspondence of the gains between the respective antennas 20 and 22 and the summing and difference networks 66 and 68.

In summary, I have described above a novel method and apparatus for producing signals for guiding a beam-riding vehicle. The guidance signals are developed in response to electromagnetic energy beamed at the vehicle and symmetrically swept about the desired path of vehicle travel. The system utilizes the sweep rate amplitude-modulation superimposed on the radiated energy received by the vehicle to develop these signals. The invention does not require that the beamed energy have a selected pulse repetition rate, polarization or other coordinate reference information. Nor does it require the development of roll reference information within the vehicle or the guiding station.

Moreover, although the invention is described in connection with a conically swept radiation pattern, a continuous pattern is not required; the system is operable with a pattern produced by lobe-switching techniques or the like, which approximate the movement of a continuously swept beam about the central axis.

Preferably, the signals developed by the antennas 20 and 22 do not fluctuate at the beam sweep rate due to changes in the polarization of the transmitted electromagnetic energy. This condition is readily achieved by using polarization insensitive antennas on the vehicle, or by maintaining the same polarization in the transmitted beam as it sweeps around the central axis 16.

While the invention has been described in connection with a typical conically sweeping radar system, its use with other forms of electromagnetic radiation will be apparent. For example, a light beam might well be used.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

What is claimed is:

1. A method for developing signals which indicate the position of a vehicle with respect to a selected path, said vehicle travelling within radiation moved in a pattern symmetrical about said path, said method comprising the steps of
    (a) sensing at two places spaced apart on said vehicle in a direction transverse to said path the energy of said radiation pattern,
    (b) developing in response to said energy sensed at each place a first signal whose amplitude and relative phase correspond to the modulation factor of said sensed energy and the relative phase of said modulation factor,
    (c) deriving a sum signal and a difference signal from said first signals,
    (d) comparing the phases of said sum and difference signals, and
    (e) comparing the phase of one of said sum and difference signals with a signal developed by shifting the phase of the other of said sum and difference signals 90°.

2. The method defined in claim 1 comprising the further step of causing the amplitude of said sum and difference signals to vary substantially solely in response to movement of said vehicle transverse to said path.

3. A method for producing two guidance signals indicating the position of a vehicle with respect to a path, said method comprising the steps of
    (a) radiating energy in a conically swept radiation pattern whose central axis coincides with said path,
    (b) sensing on two places on said vehicle that are spaced apart transverse to said central axis, the power in said pattern developed at said places,
    (c) deriving in response to the power at each place, a modulation signal whose frequency is the scan rate of said radiation, whose magnitude and relative phase correspond to the modulation factor of the sensed power from which said signal is derived and whose phase corresponds to the phase of the modulation of said power,
    (d) combining said modulation signals to produce a sum signal and a difference signal,
    (e) detecting the relative phase of said sum and difference signals,
    (f) shifting the phase of one of said sum and difference signals by 90° to provide a quadrature signal, and
    (g) detecting the relative phase of said quadrature signal and the other of said sum and difference signals.

4. A method for providing a guidance signal indicating the position of a vehicle with respect to the central axis of a conically swept radiation pattern along which the vehicle is travelling, said method comprising the steps of
    (a) sensing energy in said pattern at two places spaced apart on said vehicle in a direction transverse to said axis,
    (b) developing in response to the energy sensed in each place a modulation signal whose frequency is equal to the sweep rate of the energy in said pattern,
    (c) adding and subtracting said modulation signals to provide sum and difference signals, and
    (d) developing signals indicative of the relative phase of said sum and difference signals.

5. A method for producing a pair of guidance signals indicating the position of a vehicle having first and second antennas spaced apart transverse to the direction of travel of said vehicle, said method comprising the steps of
    (a) illuminating said antennas with a conically swept pattern of electromagnetic radiation,
    (b) adding the components of the voltages developed by said antennas which vary at the sweep rate of said radiation to produce a sum signal,
    (c) subtracting said voltage components to produce a difference signal,
    (d) phase detecting said sum and difference signals to produce one of said guidance signals, and
    (e) phase detecting one of said sum and difference signals with a further signal which corresponds to a 90° phase shift of the other of said sum and difference signals to provide the other of said guidance signals.

6. A vehicle guidance system adapted to develop a guidance signal for a vehicle travelling along the central axis of radiation around said axis, said apparatus comprising, in combination
    (a) first and second antennas spaced apart on said vehicle in a direction transverse to the direction of travel of said vehicle,
    (b) a summing network arranged to produce a sum signal corresponding to the sum of the signals produced by said antennas in response to illumination thereof by said radiation,
    (c) a difference network arranged to produce a difference signal corresponding to the difference of the signals produced by said antennas in response to illumination thereof by said radiation, and
    (d) a first phase detector connected to provide a first guidance signal whose polarity depends on the relative phases of said sum and difference signals.

7. The combination defined in claim 6 further comprising
    (a) a phase shifter connected to develop a quadrature signal corresponding to a phase shift of 90° of one of said sum and difference signals, and
    (b) a second phase detector connected to develop a second guidance signal whose polarity depends on the relative phases of said quadrature signal and the other of said sum and difference signals.

8. Apparatus for producing a guidance signal corresponding to the position of a vehicle in a first direction transverse to the central axis of a pattern of conically swept radiation, said vehicle travelling substantially along said axis, said apparatus comprising, in combination,
    (a) first and second antennas spaced apart on said vehicle in a direction transverse to said axis,
    (b) a receiver connected to process the signal intercepted by each of said antennas and provide an output signal corresponding to the modulation of said intercepted signal due to the sweeping of said radiation pattern,
    (c) means for maintaining constant the strengths of the carriers whose modulations provide said receiver output signals,
    (d) a sum network connected to produce a sum signal corresponding to the sum of said receiver output signals,
    (e) a difference network connected to provide a difference signal corresponding to the difference between said receiver output signals, and
    (f) a phase detector connected to develop said guidance signal by comparing the phases of said sum and difference signals.

9. The combination defined in claim 8 including
    (a) a phase shifter connected to derive a quadrature signal by shifting the phase of one of said sum and difference signals 90°, and (b) a second phase detector connected to develop a second guidance signal by comparing the phases of said quadrature signal and the other of said sum and difference signals.

10. The combination defined in claim 8 including
(a) means for controlling the amplitudes of said sum signals,
(b) means for controlling the amplitude of said difference signal,
(c) a reference source,
(d) means comparing the amplitude of said difference signal with the output of said reference source,
(e) means responsive to the output of said comparing means for operating both said amplitude controlling means to minimize the difference between said difference signal and said reference source output.

11. The combination defined in claim 10 including
(a) a phase shifter connected to derive a quadrature signal by shifting the phase of one of said sum and difference signals 90°, and
(b) a second phase detector connected to develop a second guidance signal whose polarity depends on whether said quadrature signal has a component in phase with or in phase opposition to the other of said sum and difference signals.

12. Guidance apparatus for producing two guidance signals indicating the position of a vehicle with respect to the central axis of a pattern of conically swept radiation, said apparatus comprising, in combination, (a) first and second antennas spaced apart on said vehicle in a direction transverse to said axis,
(b) voltage summing means connected with said antennas and producing a sum signal proportional to the sum of the components of the antenna voltages that vary at the sweep rate of said radiation,
(c) voltage difference means connected with said antennas and producing a difference signal proportional to the difference between the components of the antenna voltages that vary at the sweep rate of said radiation,
(d) a first phase detector operating on said sum signal and said difference signal to produce a first guidance signal whose polarity depends on whether said sum and difference signals have components in phase or in phase opposite to each other,
(e) a phase shifter connected to shift the phase of one of said sum and difference signals 90° to develop a quadrature signal,
(f) a second phase detector connected to operate on said quadrature signal and the other of said sum and difference signals to produce a second guidance signal, and
(g) steering means arranged to steer said vehicle toward said central axis in response to said guidance signals.

No references cited.

SAMUEL FEINBERG, *Primary Examiner.*

W. C. ROCH, *Assistant Examiner.*

UNITED STATES PATENT OFFICE
CERTIFICATE OF CORRECTION

Patent No. 3,255,984                           June 14, 1966

Russell B. Hawes

It is hereby certified that error appears in the above numbered patent requiring correction and that the said Letters Patent should read as corrected below.

Column 1, line 18, for "station," read -- station --; column 2, line 29, strike out "developed"; line 52, strike out "12"; column 3, line 45, for "FIG. 2" read -- FIG. 3 --; line 70, for "29" read -- 31 --; column 4, line 17, strike out "29"; line 37, for "$V_2$" read -- $E_2$ --; line 48, for "deevloped" read -- developed --; line 51, for "14" read -- 16 --; line 55, for "Thues" read -- Thus --; column 6, line 50, strike out "29"; line 62, for "second" read -- video --; column 7, line 6, for "isc ompared" read -- is compared --; lines 39, 46 and 50, for "$\delta_\phi$", each occurrence, read -- $\delta_Q$ --; column 12, line 16, for "opposite" read -- opposition --.

Signed and sealed this 26th day of September 1967.

(SEAL)
Attest:

ERNEST W. SWIDER                          EDWARD J. BRENNER
Attesting Officer                      Commissioner of Patents